Dec. 27, 1949    K. P. CHAMBERLAIN    2,492,783
COUNTERBORING TOOL
Filed March 27, 1948                                3 Sheets-Sheet 1
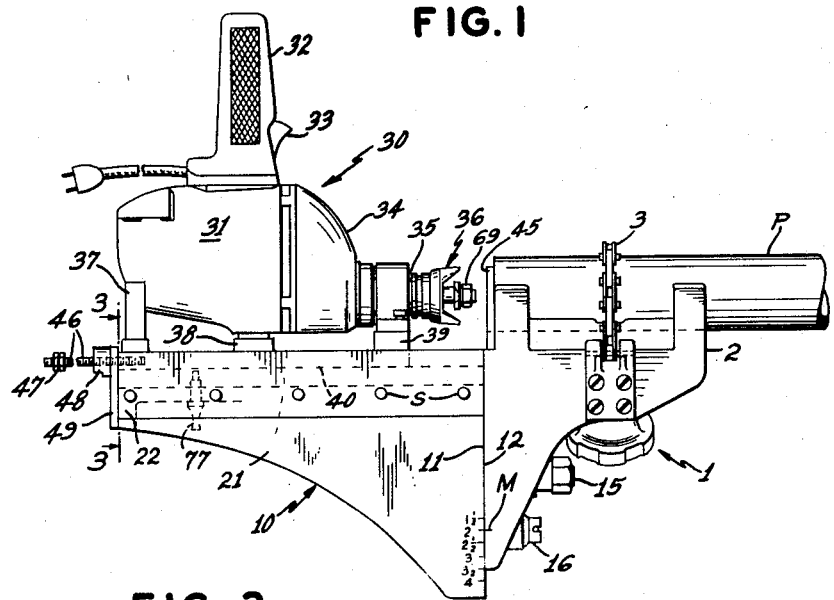
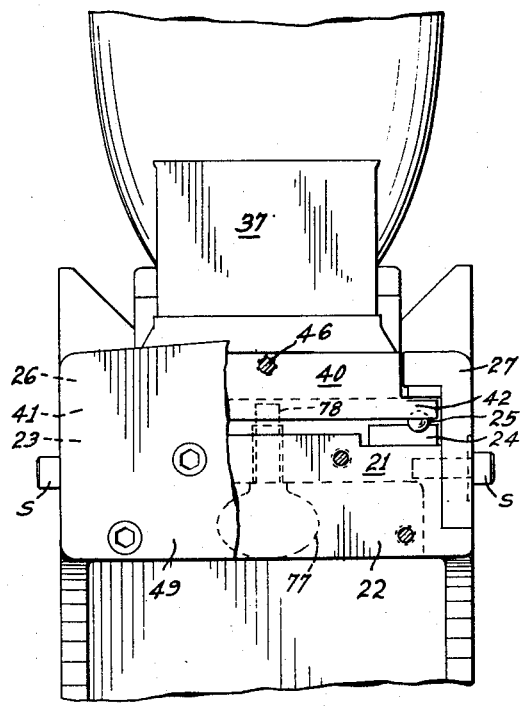
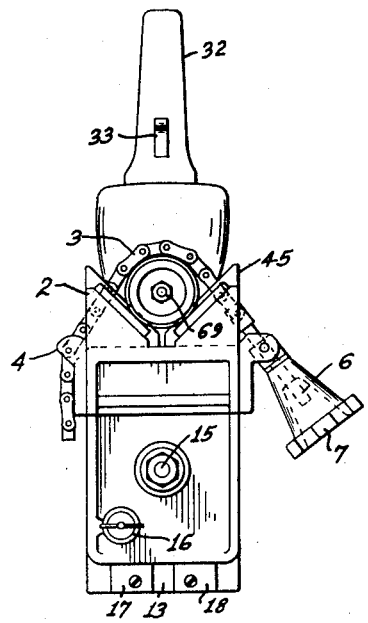
INVENTOR
Kenneth P. Chamberlain
BY
Pennie, Edmonds, Morton & Barrows
ATTORNEYS

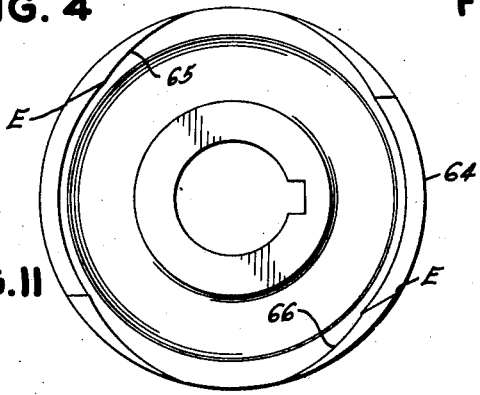
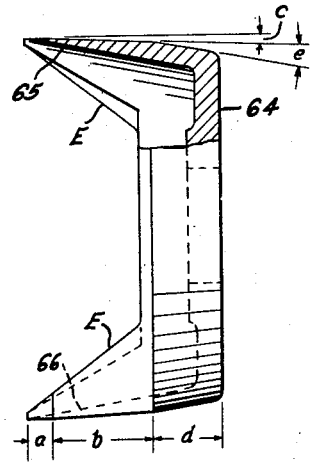
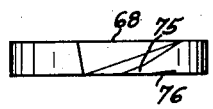
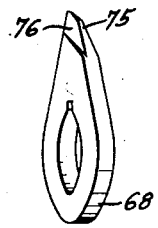
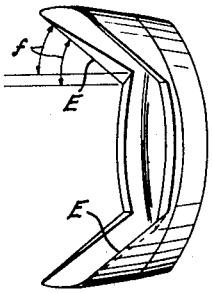
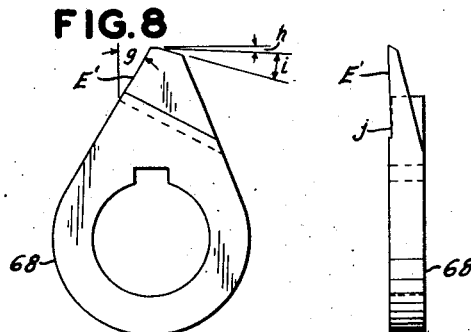
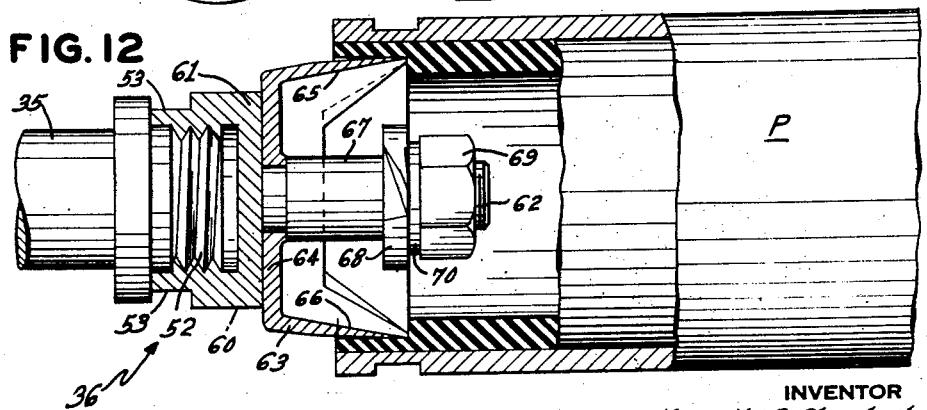

Dec. 27, 1949  K. P. CHAMBERLAIN  2,492,783
COUNTERBORING TOOL
Filed March 27, 1945  3 Sheets-Sheet 3
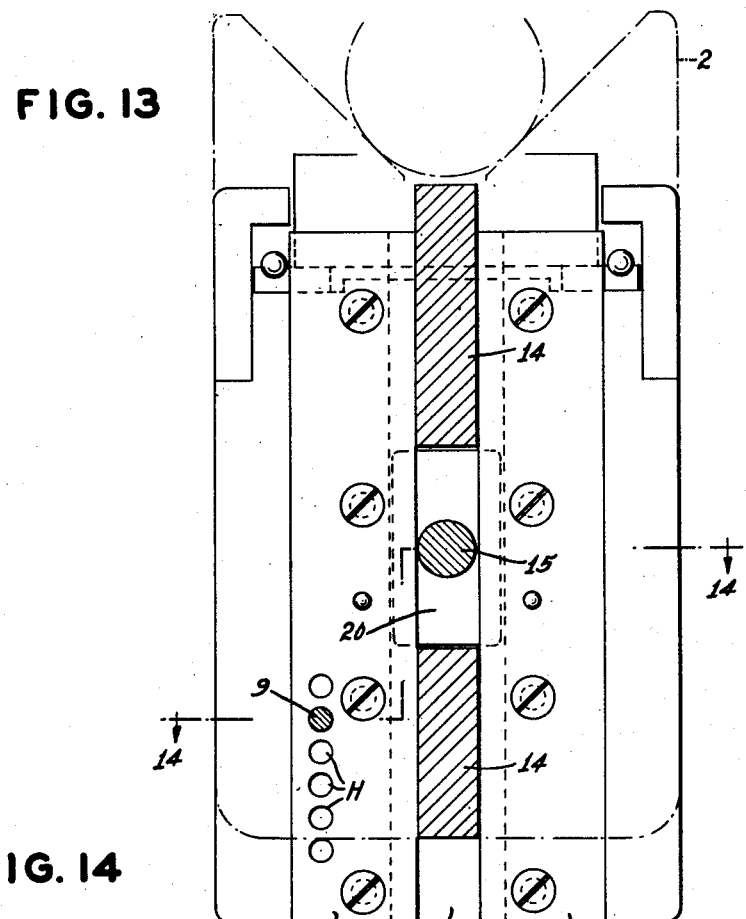
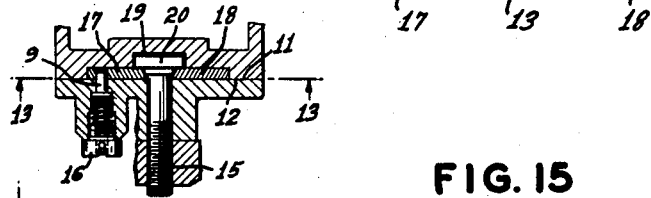
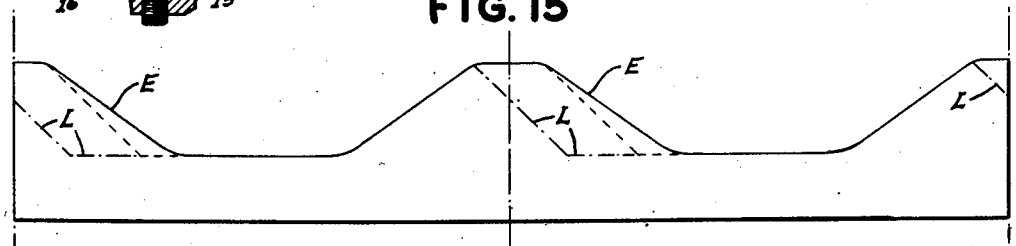
INVENTOR
Kenneth P. Chamberlain
BY
Pennie, Edmonds Morton & Barrows
ATTORNEYS Patented Dec. 27, 1949

2,492,783

UNITED STATES PATENT OFFICE 2,492,783

COUNTERBORING TOOL

Kenneth P. Chamberlain, Chester, Pa., assignor to Gates Engineering Company, a corporation of Delaware Application March 27, 1948, Serial No. 17,430

9 Claims. (Cl. 164—60)

1

This invention relates to rubber lined pipe and to the preparation of joints therefor, and has for its object the provision of an improved cutting tool and a machine for counterboring the rubber lining at the end of the pipe, for example, to receive a joint-sealing member. My machine effects a rapid, clean cut of various kinds of rubber, especially the soft resilient rubber, and is notable for its effective counterboring of soft rubber which could not be counterbored heretofore.

I have conceived and perfected a cutting tool with blades so constructed, positioned and operated as to effect a clean boring cut of soft rubber and in a very rapid manner. My cutting tool comprises a combination of cutting blades which effect simultaneously a radial helical cut and a circumferential cut, leaving a clean counterbore in the rubber lining. The cutting edges of the blades are shaped to prevent rubbing on the wall of the rubber bore and are sloped so that they slice the rubber with a dragging cut and accordingly do not appreciably displace the rubber during cutting. In a preferred embodiment of the invention, I fix both blades in a cutter head mounted on a rotatable and reciprocable shaft; advantageously the blades are so set that they both cut in the same radial plane as they rotate.

In one embodiment of my invention, I provide a machine having a clamping means for attachment to an end of the pipe to be bored and a drive means for the shaft with guide means for centering the cutter head in the pipe. I prefer to use a clamp and guide means which automatically center the cutter head when the pipe is held, and means to provide for a relative adjustment of the guide means with respect to the clamp to accommodate pipes of different sizes.

These and other novel features of the invention will be better understood after considering the following discussion taken in conjunction with the accompanying drawings, in which:

Fig. 1 is a side view of a machine of the invention;

Fig. 2 is a front end view of Fig. 1;

Fig. 3 is a partial rear end view of Fig. 1 with parts removed;

Fig. 4 is an end view of the circumferential cutter;

Fig. 5 is a view taken at right angles to Fig. 4 and partly in section;

Fig. 6 is a perspective of the cylindrical cutter of Fig. 4;

Figs. 7, 8 and 9 are an end view, plan view, and side view, respectively, of the radial cutter;

Fig. 10 is a perspective of the radial cutter of Fig. 7;

Fig. 11 is a side view of another form of radial cutter;

Fig. 12 is a longitudinal side view partly in section illustrating the cutter head and its position in the counterboring of a rubber lining;

Fig. 13 is an enlarged view along line 13—13 of Fig. 14;

Fig. 14 is a view along line 14—14 of Fig. 13, and

Fig. 15 is a development of the circumferential cutter.

In that embodiment of my invention illustrated in the drawings, my counterboring machine is portable and the parts so constructed and integrated that the machine may be operated while clamped on and supported by the pipe. The machine comprises a pipe clamp or vice 1 having a V-block 2 for receiving the pipe P to be counterbored, and a chain 3 which is adjustably attached at one end in the slot 4 of the block and at the other end to a bolt 6 threaded into the knob 7 for tightening the chain over the pipe.

The slide bracket 10 has a flat face 11 in contact with the flat face 12 of the clamp and a groove 13 in engagement with the guides 14 on the clamp to effect guided up and down motion of the slide bracket. The slide bracket 10 is secured to the clamp by the T-bolt 15. The spring pressed plunger 16 has a cylindrical end 9 which enters one of the selected holes H in the plate 17 on the slide bracket to effect a precise positioning of the slide bracket, as will be explained later. Another plate 18 is also attached to the slide bracket which, with plate 17, provides a slot 19 for the head 20 of the bolt 15. The marks representing pipe sizes on the slide bracket are set opposite the mark M on the clamp.

The slide bracket comprises a platform 21 extending from the face 11 to the transverse end 22 with race bars 23 and 24 attached thereto for the ball bearings 25 and side keeper plates 26 and 27 attached to the sides of the slide bracket with stud bolts S.

The power unit 30 comprises an electric motor 31, a handle 32 with electric switch 33, and a reduction gear (not shown) in the housing 34 which drives the shaft 35 to which the cutter head 36 is removably attached. For satisfactory results the cutter head is usually driven at a speed of around 250 to 280 R. P. M. The power unit is attached by brackets 37, 38 and 39 to a base plate 40. The under side of the base plate comprises two side races 41 and 42 for the balls 25. The power unit is, accordingly, freely slidable on the ball bearings through the required stroke.

The clamp has a stop plate 45 which sets the clamp in a precise endwise location on the pipe and the power unit is movable rearward (away from the pipe) just enough for proper clearance of the cutter head. The power unit is movable forward just enough to counterbore the end to the required depth. In order to control the depth of cut, the screw 46 is fixed to the base plate 40 and the lock nuts 47 strike the stop lug 48 which is attached to the end cover plate 49. The lock nuts 47 are adjustable on the screw 46 to strike the lug 48 and stop the forward travel of the cutter head and limit the depth of cut.

As is best shown in Fig. 12, the cutter head 36, which is an especially important part of my invention, rotates clockwise and has right hand internal threads 52 in the arbor 60 in threaded connection with the end of the shaft 35. The cutter head is readily replaceable by the use of a wrench which engages the flat faces 53 and since each head bores but one size of pipe, it must be changed for each different size of pipe. In adjusting the machine for pipes of different sizes, the clamp is secured to the pipe end as shown in Fig. 1, the nut for bolt 15 is loosened and the plunger 16 is pulled out, removing the cylindrical end 9 from hole H. The platform is then freely movable and can be set with the number of the size of pipe opposite the line M as best shown in Fig. 1. The plunger is then released and the cylindrical end enters the corresponding hole H and effects a precision centering of the cutter head in the pipe.

The arbor 60 has an annular shoulder 61 and a cylindrical bar 62 for mounting the cutter blades. The circumferential cutter 63 has a flat base 64 which bears on the shoulder 61, a central hole for sliding over the bar 62 and two integral oppositely disposed cutter blades 65 and 66. The spacing bushing 67 bears against the flat base 64 and provides a base for the radial cutter blade 68. The cutters are preferably keyed to the bar 62 by ordinary keys (not shown) and are secured in position by the nut 69 which bears directly on the arbor washer 70 which is also keyed to the bar 62.

The cutter blades 65 and 66 are cylindrical segments shaped to achieve the circumferential cut in the rubber lining. As shown in Figs. 4 and 5, the tip edge portions are exteriorly cylindrical for the distance $a$, for the distance $b$ they converge conically making an angle $c$ of about 3° from the longitudinal axis, and for the distance $d$ the base of the blade is the frustum of a cone making an angle $e$ of about 10° from the longitudinal axis. The angles $c$ and $e$ prevent the cutters from rubbing on the cut surfaces immediately behind the edges E.

The blades are beveled from the inside to the edges, and the edges recede or slope backward so that the tips of the edges lag rather than lead, giving a slicing cut. In a very practical embodiment of my invention, an angle $f$ of around 30° gives a very good cut. By reference to Fig. 15, it will be seen that the edges may be sharpened repeatedly until the metal is removed to the lines L.

The radial cutter of Figs. 7 to 10 has a cutting edge E' which slopes backward angle $g$ varying from about 10° to 20° from the radius. With reference to Figs. 7 and 10, it will be seen that the edge is formed by the cuts 75 and 76. The edge of the blade is in the radial plane and makes a square cut at the end of the bore, as shown in Fig. 12. When the lining is of very soft rubber, for example, the low durometer neoprene, a flat cut base is preferred.

As seen in Fig. 8, the peripheral edge slopes inward a short distance, say, 1/32 inch, at an angle $h$ of about 3° and for the remainder of the distance at an angle $i$ of about 10°. The angle of the blade between faces 75 and 76 is around 15° and the face 76 is sloped away from the edge at an angle $j$ from the radial plane of the edge at an angle of about 2° and this prevents the blade from rubbing on the cut surface of the rubber directly behind the cutting edge.

Fig. 11 illustrates a modified radial cutter especially for cutting the harder kinds of rubber where it is desirable to slope the inner edge of the bore. The cutting edge is sloped at an angle $k$ of about 20° from the radial plane. In other respects, the cutter is shaped as the cutter of Figs. 7 to 10.

In operating the portable machine of my invention, the nut of bolt 15 is loosened and plunger 16 is pulled out to release the slide bracket, and the number of the pipe diameter on slide bracket 10 is set opposite mark M. The plunger 16 is released to align the parts and the nut on bolt 15 is tightened. A cutter head for boring a pipe of the size indicated by the setting is screwed onto the shaft 35 and the pipe to be bored is secured by the chain 3 in the clamp with the end of the pipe against the block 45. The nuts 47 are set to regulate the depth of the counterbore. When the machine is not being used, the motor driven unit 30 is secured to the slide bracket by the wing screw 77 which is threaded into the platform 19 and has a smooth end which enters a hole 78 in the base plate 40. This screw is removed from its securing engagement and the machine is ready to operate.

The cutter head of my invention will cut various kinds of rubber and like materials. It is especially effective in the counterboring of soft resilient rubber of low durometer, for example, natural rubber from 45 to 70 durometer or neoprene from 65 to 70 durometer. It will also bore rubbers of higher durometer.

In operating the cutter head of my invention, it is helpful to lubricate the blades with a suitable solvent, such as the water-soluble oils, commonly used on machine tools.

I claim:

1. A machine for counterboring the rubber lining of a pipe which comprises a clamp for engaging the pipe, a cutter head comprising a blade for effecting a circumferential cut and a blade for effecting a radial cut, both cuts being made simultaneously thereby removing the rubber from the counterbore, means for centering the cutter head in the pipe and for guiding it in its movement into and out of the pipe, and means for driving the cutter head.

2. A machine for counterboring the rubber lining of a pipe which comprises a clamp for engaging the pipe, a cutter head comprising two diametrically opposite blades of arcuate shape to effect a circumferential cut and at least one blade for effecting a radial cut, each blade having a cutting edge which slopes in such manner as to effect a slicing cut, means for centering the cutter head in the pipe and for guiding it in its movement into and out of the pipe, and means for driving the cutter head.

3. A machine for counterboring the rubber lining of a pipe which comprises means for centering the machine with respect to the pipe, a cutter head comprising two diametrically opposite blades of arcuate shape to effect a circumferential cut and at least one blade for effecting a radial cut, each blade of arcuate shape having a receding cutting edge and an arcuate exterior which is a cylindrical segment at the cutting edge and the remainder sloping away from the cylindrical segment, the radial cutting blade having a receding cutting edge and a cutting edge surface facing the freshly cut surface of the rubber which slopes away from the rubber and does not contact the uncut rubber, means for guiding the cutter head in a reciprocable movement into and out of the pipe, and means for driving the cutter head.

4. A machine according to claim 1 which comprises a clamp for securing the machine to the pipe, a bracket on which the cutter head is rotatably and slidably mounted and means for adjustably connecting the bracket to the clamp to counterbore pipes of different diameters.

5. A tool for boring rubber and the like which comprises means for attachment to a drive shaft, an arcuate shaped blade attached to said means having at least one edge for effecting a circumferential cut and another blade attached to said means having an edge for effecting a radial cut, the edges of each of said blades receding at an angle to make a dragging cut.

6. A tool according to claim 5 in which the edges of the two blades cut in a radial plane.

7. A tool for boring rubber and the like which comprises means for attachment to a drive shaft, an arcuate shaped blade attached to said means having at least one edge for effecting a circumferential cut and another blade attached to said means having an edge for effecting a radial cut, the edges of each of said blades receding at an angle to make a dragging cut, and the blades being sloped away from the edges so they do not bear against the freshly cut surfaces of the rubber.

8. A tool for boring rubber and the like which comprises means for attachment to a drive shaft, an arcuate shaped cutter attached to said means having two diametrically opposite blades for effecting a circumferential cut, and another blade attached to said means for effecting a radial cut, the edges of each of said blades receding at an angle to make a dragging cut, the exteriors of the diametrically opposite blades being sloped inwardly from the peripheral edges toward the axis of rotation and the leading face of the blade for effecting a radial cut being sloped backwards from the radial plane of the edge.

9. A tool according to claim 8 in which the cutting edges of the blades rotate in the same radial plane.

KENNETH P. CHAMBERLAIN.

No references cited.